United States Patent
Bhanage et al.

(10) Patent No.: US 11,012,469 B2
(45) Date of Patent: May 18, 2021

(54) DETECTING AND PREVENTING DENIAL OF SERVICE ATTACKS DUE TO FRAUDULENT BSS COLOR COLLISION EVENTS

(71) Applicant: Cisco Technology, Inc., San Jose, CA (US)

(72) Inventors: Gautam Bhanage, Milpitas, CA (US); David Kloper, Santa Clara, CA (US); Brian Hart, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 280 days.

(21) Appl. No.: 16/253,329

(22) Filed: Jan. 22, 2019

(65) Prior Publication Data
US 2020/0236134 A1   Jul. 23, 2020

(51) Int. Cl.
*H04L 29/06*     (2006.01)
*H04W 12/00*     (2021.01)
*H04W 84/12*     (2009.01)

(52) U.S. Cl.
CPC ...... *H04L 63/1458* (2013.01); *H04L 63/1425* (2013.01); *H04W 12/009* (2019.01); *H04L 2463/142* (2013.01); *H04W 84/12* (2013.01)

(58) Field of Classification Search
CPC ............. H04L 63/1458; H04L 63/1425; H04L 2463/142; H04W 12/009; H04W 84/12; H04W 12/122
See application file for complete search history.

(56) References Cited

U.S. PATENT DOCUMENTS 7,286,515 B2    10/2007  Olson et al.
7,804,808 B2 *   9/2010  Bhagwat ................. H04K 3/86
                                                        370/338
(Continued)

FOREIGN PATENT DOCUMENTS

CN       108471637 A  *  8/2018
KR      20180002667 A  *  1/2018  ......... H04L 12/1886
WO       2016112306 A1    7/2016
(Continued)

OTHER PUBLICATIONS

Anil Kumar et al., "Detection and Prevention Against Evil Twin Attack in WLAN", International Journal of Computer Engineering and Applications, Special Edition, ISSN 2321-3469, Aug. 2, 2016, 6 pages.
Taimur Farooq et al., "MAC Layer DoS Attacks in IEEE 802.11 Networks", ISBN: 978-1-902560-24-3, 2017, Jan. 2010, 6 pages.
(Continued)

*Primary Examiner* — John B King
(74) *Attorney, Agent, or Firm* — Edell, Shaipro & Finnan, LLC

(57) ABSTRACT

A management entity obtains from a first wireless access point a Basic Service Set (BSS) color collision event detected by the first wireless access point. The first wireless access point uses a first BSS color. A color collision event occurs when the first wireless access point receives from a device in a BSS of a different physical wireless access point a frame or PHY Protocol Data Unit (PPDU) that includes the first BSS color. The management entity obtains from the first wireless access point an indication whether the color collision event has been detected for longer than a predetermined duration. When the color collision event has been detected for longer than the predetermined duration, the management entity computes a probability of the color collision event. The management entity determines whether the color collision event is malicious or benign, and determines whether to maintain the first BSS color.

20 Claims, 5 Drawing Sheets

(56) References Cited

U.S. PATENT DOCUMENTS

| | | | |
|---|---|---|---|
| 7,890,745 B2* | 2/2011 | Qi | H04W 12/1006 |
| | | | 713/150 |
| 9,942,193 B1 | 4/2018 | Chu et al. | |
| 10,397,928 B1* | 8/2019 | Hahn | H04L 41/12 |
| 2017/0359300 A1* | 12/2017 | Patil | H04L 61/1541 |
| 2017/0367129 A1* | 12/2017 | Yang | H04W 24/02 |
| 2018/0110046 A1 | 4/2018 | Patil et al. | |
| 2018/0184285 A1 | 6/2018 | Patil et al. | |
| 2018/0235002 A1* | 8/2018 | Son | H04L 69/22 |
| 2018/0359779 A1* | 12/2018 | Kim | H04W 74/085 |
| 2019/0021091 A1* | 1/2019 | Ko | H04W 72/0453 |
| 2019/0082387 A1* | 3/2019 | Kim | H04W 52/0206 |
| 2019/0342891 A1* | 11/2019 | Asterjadhi | H04W 84/12 |
| 2019/0357256 A1* | 11/2019 | Kim | H04W 48/16 |
| 2020/0092912 A1* | 3/2020 | Bhanage | H04W 16/18 |

FOREIGN PATENT DOCUMENTS

| | | | | |
|---|---|---|---|---|
| WO | WO-2017188712 A2 * | 11/2017 | | H04W 52/0229 |
| WO | WO-2018128497 A1 * | 7/2018 | | H04W 74/0816 |

OTHER PUBLICATIONS

Ioannis Selinis et al., "Evaluation of the DSC algorithm and the BSS Color scheme in dense cellular-like IEEE 802.11ax deployments", 978-1-5090-3254-9/16, 2016 IEEE 27th Annual International Symposium on Personal, Indoor, and Mobile Radio Communications (PIMRC), Sep. 4-8, 2016, 7 pages.

Alberto Lopez Toledo et al., "Robust Detection of MAC Layer Denial-of-Service Attacks in CSMA/CA Wireless Networks", IEEE Transactions on Information Forensics and Security, vol. 3, No. 3, 1556-6013, Sep. 2008, 12 pages.

* cited by examiner

400

402 — OBTAIN, AT A MANAGEMENT ENTITY FOR A WLAN, FROM A FIRST ACCESS POINT USING A FIRST BASIC SERVICE SET (BSS) COLOR, A COLOR COLLISION EVENT DETECTED BY THE FIRST ACCESS POINT, WHEREIN A BSS COLOR IS AN IDENTIFIER INCLUDED IN TRANSMISSIONS BY THE FIRST WIRELESS ACCESS POINT TO DISTINGUISH DIFFERENT BSSS USING A COMMON OR OVERLAPPED FREQUENCY CHANNEL AND A COLOR COLLISION EVENT OCCURS WHEN THE FIRST WIRELESS ACCESS POINT RECEIVES FROM A DEVICE IN A BSS OF A DIFFERENT PHYSICAL WIRELESS ACCESS POINT A FRAME OR PPDU THAT INCLUDES THE FIRST BSS COLOR

404 — OBTAIN, FROM THE ACCESS POINT, AN INDICATION OF WHETHER THE COLOR COLLISION EVENT HAS BEEN DETECTED FOR A TIME PERIOD GREATER THAN A PREDETERMINED DURATION THRESHOLD

406 — WHEN THE COLOR COLLISION EVENT HAS BEEN DETECTED FOR THE TIME PERIOD GREATER THAN THE PREDETERMINED DURATION THRESHOLD, COMPUTING A PROBABILITY OF THE COLOR COLLISION EVENT

408 — BASED ON THE PROBABILITY OF THE COLOR COLLISION EVENT, DETERMINE WHETHER THE COLOR COLLISION EVENT IS BENIGN OR MALICIOUS

410 — MAINTAINING THE FIRST BSS COLOR OF THE ACCESS POINT WHEN THE COLOR COLLISION EVENT IS MALICIOUS

FIG.4

DETECTING AND PREVENTING DENIAL OF SERVICE ATTACKS DUE TO FRAUDULENT BSS COLOR COLLISION EVENTS

TECHNICAL FIELD

The present disclosure relates to wireless network security.

BACKGROUND

A Basic Service Set (BSS) color mechanism was added to the IEEE 802.11ax amendment for improving spatial reuse across wireless local area networks (WLANs). High efficiency (HE) Physical Protocol Data Units (PPDUs) are decoded by a WLAN if they meet the BSS color and the associated signal strength criteria. As a part of this mechanism, the standard also included a protection mechanism that alerts when the BSSs involuntarily choose the same color, which can reduce spatial reuse efficiency. This is done through a BSS color collision event detection mechanism.

BRIEF DESCRIPTION OF THE DRAWINGS

FIG. 4 is a flowchart depicting a method for detecting and containing malicious color collision events, according to an example embodiment.

DESCRIPTION OF EXAMPLE EMBODIMENTS

Overview

Briefly, a management entity obtains from a first wireless access point an indication of a color collision event that is detected by the first wireless access point. The first wireless access point is using a first Basic Service Set (BSS) color. A BSS color is an identifier included in transmissions to distinguish between different BSSs using a common or overlapped frequency channel. There is a color collision event when the first wireless access point receives a frame or PHY Protocol Data Unit (PPDU) that includes the first BSS color from a device in a BSS of a different physical wireless access point. The management entity also obtains from the first wireless access point an indication whether the color collision event has been detected for longer than a predetermined duration threshold. When the color collision event has been detected for longer than the predetermined duration threshold, the management entity computes a probability of the color collision event. Based on the probability, the management entity determines whether the color collision event is malicious or benign. When the color collision event is determined to be malicious, the management entity maintains the first BSS color used by the first wireless access point.

Example Embodiments

The IEEE 802.11ax standard included a BSS color collision event detection mechanism that alerts when the BSSs involuntarily choose the same color. For example, if a wireless access point in a first BSS using a first color detects a transmission from a wireless access point in a second BSS using the first color, the wireless access point in the first BSS may determine that there are overlapping BSSs. When there is a color collision event, at least one of the BSSs may change its color. However, having to constantly change color may result in an outage as all client devices of the wireless access point may need to be de-authorized and need to be re-connected and re-authorize when there is a color change. If a BSS deliberately chooses the same color as the first color used by the first BSS, thereby causing a color collision event in the first BSS, then this constitutes of a denial of service attack on the first BSS.

Figure 1:
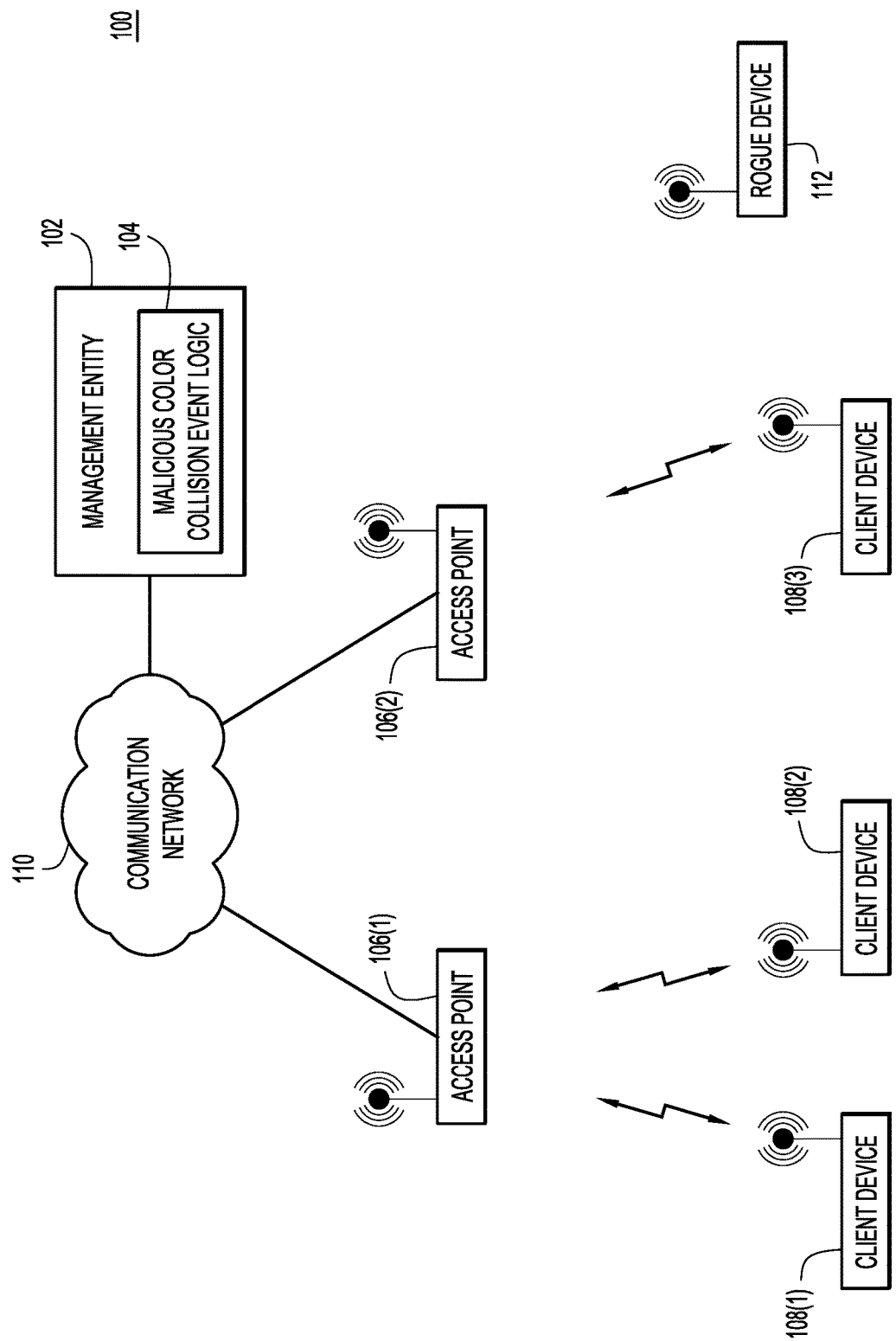
FIG. 1 is a block diagram of a wireless local area network configured to determine malicious color collision events, according to an example embodiment.

With reference made to FIG. 1, shown is a block diagram of a wireless local area network (WLAN) 100 configured to determine malicious BSS color collision events, according to an example embodiment. The WLAN 100 may include a management entity 102. The management entity 102 may include or be configured with malicious color collision event detection logic 104, as described in more detail herein. The management entity 102 may control or configure a first wireless access point 106(1) and a second wireless access point 106(2). Each of the wireless access points 106(1), 106(2) may communicate with one or more client devices 108(1)-108(3). The client devices 108(1)-108(3) may associate with one of the wireless access points 106(1), 106(2) to access a communication network 110. Also shown in FIG. 1 is a rogue device 112, as will be described in more detail herein. It should be appreciated that any number of management entities, access points, client devices, and rogue devices may be operating in the WLAN 100. The management entity 102 may be a network element that is a separate physical entity (such as a WLAN controller), co-located with an AP, or any other physical or virtual entity (including another controller within or belonging to the same administrative domain).

The client devices 108(1)-108(3) and the rogue device 112 may communicate wirelessly with the wireless access points 106(1), 106(2). The wireless access points 106(1), 106(2) may communicate using wired communication links with the management entity 102 via the communication network 110.

For example, a first BSS may include the first wireless access point 106(1) and client devices 108(1), 108(2). The devices in the first BSS may transmit high efficiency (HE) PPDUs according to the IEEE 802.11ax amendment using a first BSS color. BSS colors may be numerical values used as identifiers to increase spatial reuse across a plurality of WLANs in a given geographical area. A second BSS may include the second wireless access point 106(2) and client device 108(3). The devices in the second BSS also may transmit high efficiency PPDUs according to the IEEE 802.11ax standard using a second BSS color. The BSS colors may be used by the wireless access points 106(1), 106(2), for example, to determine whether there are any overlapping BSSs.

BSS color information is communicated at both the PHY layer and the media access control (MAC) sublayer. In the preamble of an 802.11ax PHY header, the SIG-A field contains a 6-bit BSS color field. This field can identify as many as 63 BSSs. BSS color information is also included in IEEE 802.11 management frames. The HE operation information element (IE) includes a subfield of BSS color information, also designed by six bits in size to identify as many as 63 different colors and representing 63 different BSSs.

For reference, in IEEE 802.11, a frame is a layer 2 entity. Before the frame is transmitted at layer 1, it is transformed: waveform and header fields are prepended (e.g. preamble), inserted (e.g. midamble) and/or appended (e.g. packet extension) and the frame is encoded and modulated, and thereby a PPDU is constructed that may carry many frames. Since, in 802.11ax (HE), the BSS color may be carried either in the PHY header of the PPDU, outside the frame, or in an information element within a management frame, or possibly in both the PHY header and frame, the distinction between frame and PPDU is noted here.

As an example, the first wireless access point 106(1) may detect/receive a transmission, such as a high efficiency PPDU, from a device, such as the second wireless access point 106(2) or one or more clients served by the second wireless access point 106(2) of a different BSS. Because the first wireless access point 106(1) receives a transmission from a device (different physical AP or client) in the second BSS, the first wireless access point 106(1) may determine that the BSS used by the first wireless access point overlaps with the BSS used by the second (different) physical AP or clients of that second different physical AP. Moreover, the first wireless access point 106(1) may compare the first BSS color that it is using with the second BSS color used by devices in the BSS of the second wireless access point 106(2). If the first color and the second color are different, then the first wireless access point 106(1) may determine that there is not a color collision event and, therefore, does not need to change the first color. However, if the first BSS color and the second BSS color are the same, then the first wireless access point 106(1) may determine that there is a color collision event. When there is a color collision event, then, conventionally, the first wireless access point 106(1) may change from the first BSS color to some other BSS color.

The conventional color collision event techniques may be exploited, however, by a malicious actor, such as rogue device 112. For example, the rogue device 112 may launch a denial of service attack on the first wireless access point 106(1). The rogue device 112 may send a frame in a high efficiency PPDU with a fraudulent BSS but with the same BSS color as the first BSS color used by the first wireless access point. The fraudulent BSS may indicate that the frame or PPDU has a source that is in a BSS different from the BSS used by the first wireless access point 106(1). Therefore, the first wireless access point 106(1) may determine that there is a color collision event and, consequently, change its BSS color. As a result of the first wireless access point 106(1) changing its BSS color, the client devices 108(1), 108(2) may then become de-authorized from the first wireless access point 106(1). Therefore, the client devices 108(1), 108(2) may experience a denial of service. Such denial of service attacks may be particularly harmful to battery-operated devices, such as Internet of Things (IoT) devices, because unnecessary outages may result in degraded battery life.

Figure 2:
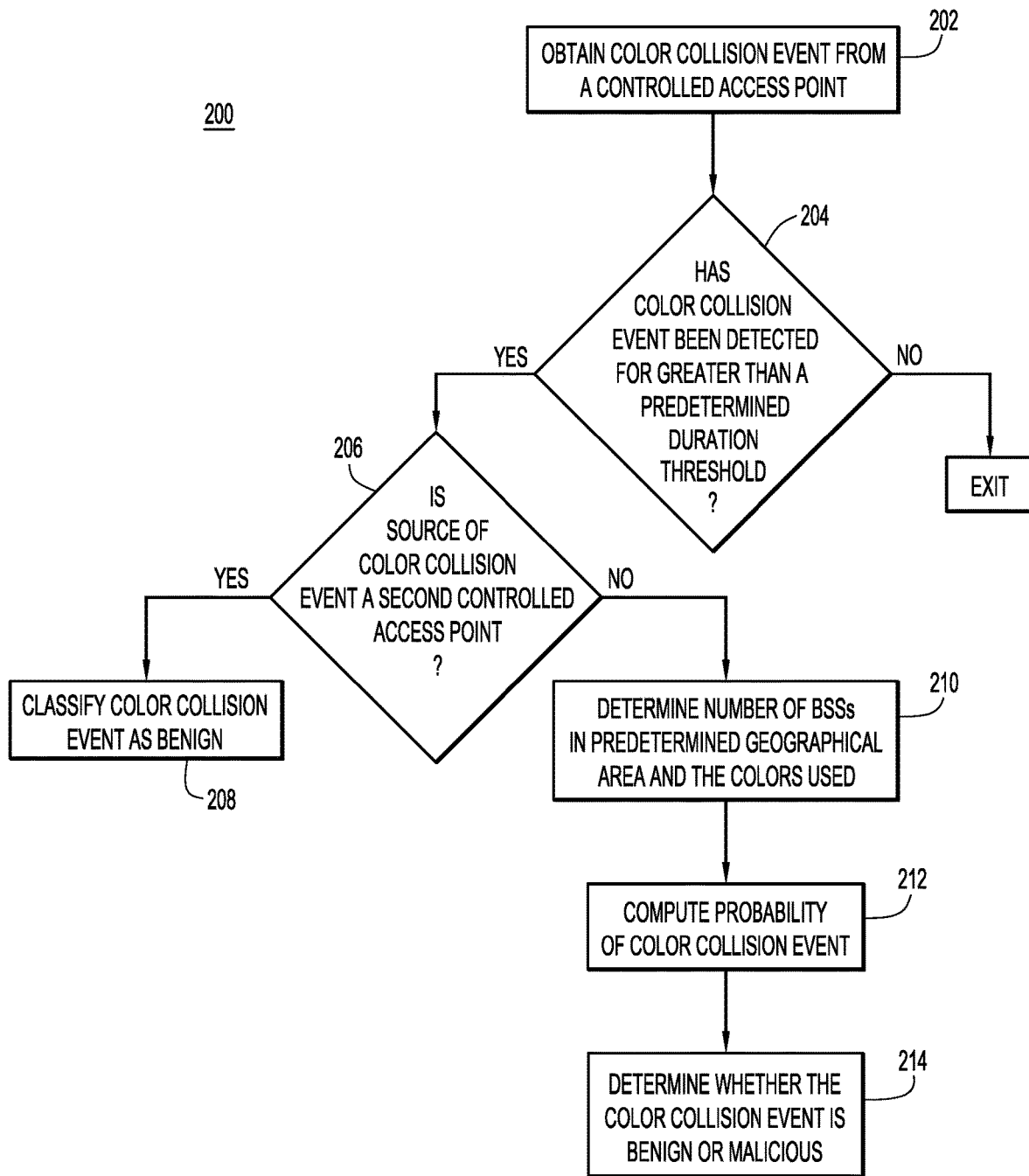
FIG. 2 is a flowchart depicting a method for determining whether a color collision event is benign or malicious, according to an example embodiment.

Turning to FIG. 2, and with continuing reference to FIG. 1, shown is a flowchart depicting a method 200 for determining whether a color collision event is benign or malicious, according to an example embodiment. The method 200 may be performed by, for example, the malicious color collision event detection logic 104 running on the management entity 102. At operation 202, the management entity 102 may obtain an indication of a detected color collision event. For example, the color collision event may be detected by the management entity 102. Alternatively, the management entity 102 may obtain a report from one of the wireless access points 106(1), 106(2), or from one or more of the client devices 108(1)-108(3) indicating that a client device has detected a color collision event.

At operation 204, the malicious color collision event detection logic 104 may determine whether the color collision event has been detected for a time interval greater than a predetermined duration threshold. When the color collision event has been detected for a time interval greater than the predetermined duration threshold, a flag may be set. However, when the color collision event has not been detected for at least the predetermined duration threshold, the flag may be cleared. In other words, the flag may be set when the color collision event has been persistent (for at least the predetermined duration threshold). When the color collision event has been detected for at least the predetermined duration threshold, then the method 200 proceeds to operation 206. However, if the color collision event has not been detected for the predetermined duration threshold, then the method 200 ends.

At operation 206, the malicious color collision event detection logic 104 may determine whether a source of the color collision event is a wireless access point controlled by the management entity 102. For example, the source of the color collision event at the first wireless access point 106(1) may be the second wireless access point 106(2). When the source is a wireless access point controlled by the management entity 102, then the method 200 proceeds to operation 208. However, if the source is not a wireless access point controlled by the management entity 102, then the method 200 proceeds to operation 210.

At operation 208, the malicious color collision event detection logic 104 may classify the color collision event as benign. The color collision event is classified as benign, rather than malicious, because the source of the color collision event is known not to be malicious as it is also controlled by the management entity 102.

However, if the source of the color collision event is not a wireless access point controlled by the management entity 102, then, at operation 210, the malicious color collision event detection logic 104 may determine how many BSSs are in a predetermined geographic area as well as which the color each BSS (in that predetermined geographic area) is using. The management entity 102 may determine this information based on transmissions received via the wireless access points 106(1), 106(2).

At operation 212, the malicious color collision event detection logic 104 may compute a probability of a color collision event. For example, the probability may be based on a number of BSS colors used by the BSSs as determined in operation 210. More specifically, the probability may be computed as $$\text{Probability of color collision event} = \frac{\text{Number of } BSS \text{ colors used by neighbors}}{\text{Maximum number of } BSS \text{ colors}}$$

In one embodiment, the maximum number of BSS colors is 63.

At operation 214, the malicious color collision event detection logic 104 may determine whether the color collision event is malicious or benign. The malicious color collision event detection logic 104 may evaluate one or more conditions to determine whether the color collision event is malicious or benign. For example, the malicious color collision event detection logic 104 may determine whether the color collision is malicious or benign based on the probability computed at operation 214. For example, the computed probability may be compared to a predetermined probability threshold. The malicious color collision event detection logic 104 may also maintain a t_color_change_window variable. The t_color_change_window variable may be a time window of a predetermined length. Each time the wireless access point changed color due to a color collision event in the preceding t_color_change_window, the malicious color collision event detection logic 104 may increment a count_color_change variable. However, if there was no color change due to a color collision event in the preceding t_color_change_window, then the malicious color collision event detection logic 104 may clear, or set to zero, the count_color_change variable. The malicious color collision event detection logic 104 may also compare the value of the count_color_change variable to a predetermined count color change threshold. When both the computed probability is less than the predetermined probability threshold and the count_color_change variable is greater than the predetermined count color change threshold, the malicious color collision event detection logic 104 may classify the color collision event as malicious.

Alternatively, if the first condition is not satisfied, the malicious color collision event detection logic 104 may compare the count_color_change value to a product of the predetermined count color change threshold and the probability of the color collision event. If the count_color_change value is greater than the product, then the malicious color collision event detection logic 104 may classify the color collision event as malicious.

The malicious color collision event detection logic 104 may also classify the color collision event as malicious if both a second condition and a third condition are satisfied. To satisfy the second condition, the malicious color collision event detection logic 104 may compare a period of time the management entity 102 has tracked the source of the color collision event to a predetermined tracking time threshold. In other words, the malicious color collision event detection logic 104 may determine tracked percentage of time when a colliding BSS color PPDU or frame is present on the channel. For example, if there are collision frames or PPDUs a small percentage of the time (e.g., 1% or less), then there is minimal impact to the AP or its clients due to this collision and no action need be taken.

To satisfy the third condition, the malicious color collision event detection logic 104 may determine whether the management entity 102 has detected any client devices being served by the BSS of the source of the color collision event in the previous tracking window. The third condition is satisfied when the management entity 102 has not detected any such client devices. When both the second and third conditions are satisfied, then the malicious color collision event detection logic 104 may classify the color collision event as malicious.

The malicious color collision event detection logic 104 may also classify the color collision event as malicious when a fourth condition is satisfied. The fourth condition is based on an airtime and a received signal strength of the PPDUs causing the color collision event. For example, the malicious color collision event detection logic 104 may compare an airtime percentage of the PPDUs with a predetermined airtime percentage threshold. The malicious color collision event detection logic 104 may also compare the received signal strength indicator of the PPDUs with a predetermined received signal strength indicator threshold. If the airtime percentage of the PPDUs is greater than the predetermined airtime percentage threshold and the received signal strength of the PPDUs causing the color collision event is greater than the predetermined received signal strength indicator threshold, then the malicious color collision event detection logic 104 may classify the color collision event as malicious.

Therefore, when the first, second and third, or fourth conditions are satisfied, the malicious color collision event detection logic 104 may classify the color collision event as malicious. However, if none of the first, second or third, and fourth conditions is satisfied, the malicious color collision event detection logic 104 may classify the color collision event as benign.

Figure 3:
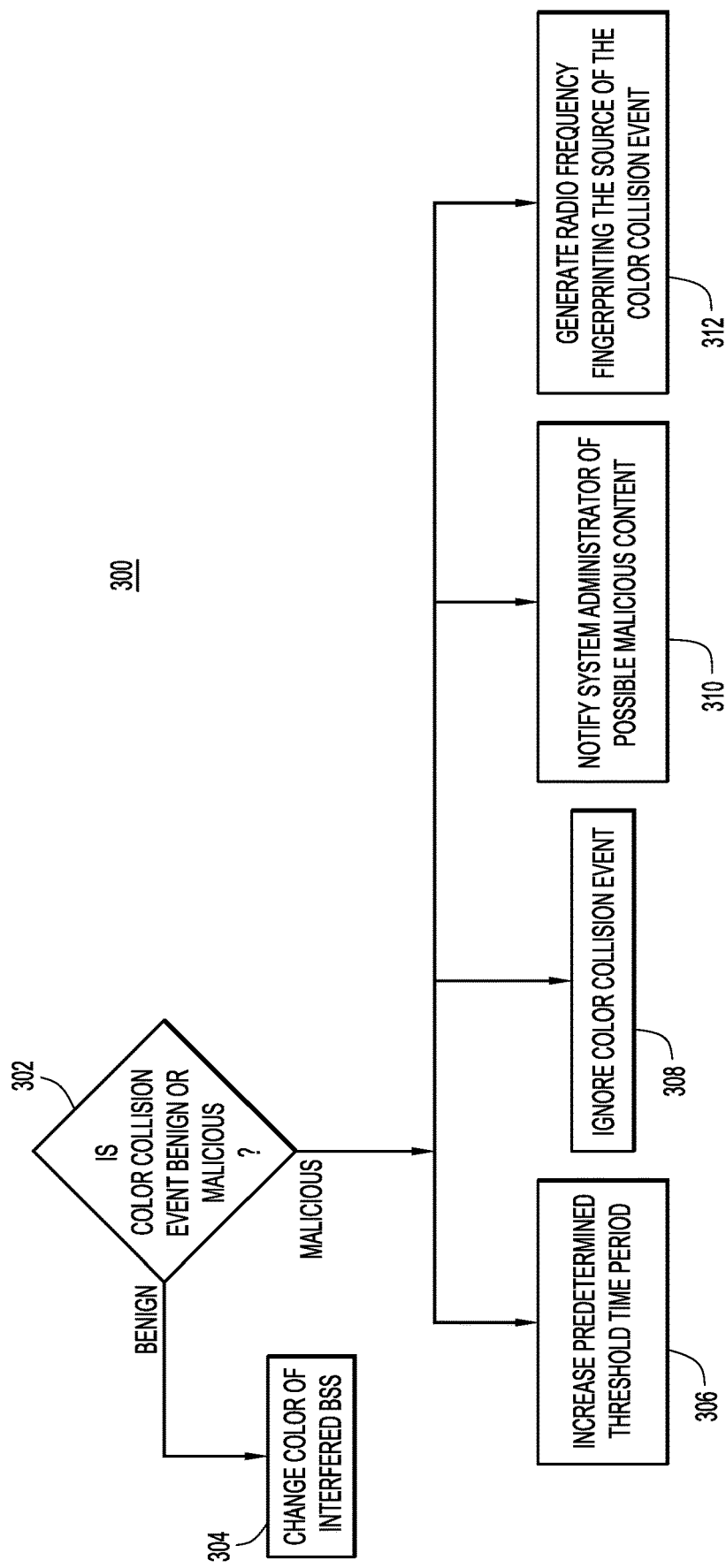
FIG. 3 is a flowchart depicting a method for performing an action based on whether the color collision event is classified as benign or malicious, according to an example embodiment.

Turning to FIG. 3, and with continuing reference to FIGS. 1 and 2, shown is a flowchart depicting a method 300 for performing an action based on whether the color collision event is classified as malicious or benign, according to an example embodiment. The method 300 may be performed by, for example, the malicious color collision event detection logic 104 running on the management entity 102. At operation 302, the malicious color collision event detection logic 104 may determine whether the color collision event is classified as malicious or benign. For example, the method 200 described in FIG. 2 may be used to determine whether the color collision event is malicious or benign. If the color collision event is classified as benign, then the method 300 may proceed to operation 304. However, if the color collision event is classified as malicious, the method 300 may proceed to at least one of operations 306, 308, 310, or 312.

At operation 304, the malicious color collision event detection logic 104 may change the color of the BSS. Because the color collision event is classified as benign, there is low risk that the color collision event is an attempt to cause a denial of service attack by the rogue device 112. In addition to changing the BSS color, various statistics may be updated. For example, because the first wireless access point 106(1) changes BSS color, the count_color_change variable may be incremented. Moreover, the malicious color collision event detection logic 104 may identify the BSS color that caused the benign color collision event. The first wireless access point 106(1) may then notify n-hop neighbors to prevent that BSS color from being used by the n-hop neighbors on the channel. The n-hop neighbors on the same channel would be prevented from using the same BSS color as long as they persist on the same channel. The value for n may be a predefined integer. In this manner, the first wireless access point 106(1) prevents its n-hop neighbors from experiencing a benign color collision event for that color.

In contrast, when the color collision event is classified as malicious, the method 300 may proceed to one or more of operations 306, 308, or 310. At operation 306, the malicious color collision event detection logic 104 may increase the predetermined duration threshold. By increasing the predetermined time threshold, the malicious color collision event detection logic 104 increases the amount of time the first wireless access point 106(1) receives color collision PPDUs before it is marked as a persistent color collision. In other words, the malicious color collision event detection logic 104 becomes less sensitive to color collision events. At operation 308, the malicious color collision event detection logic 104 may ignore the color collision event. In other words, the color collision event does not cause a BSS color change at the first wireless access point 106(1). At operation 310, the malicious color collision event detection logic 104 may notify a system administrator of the WLAN 100 that there is potentially malicious content near the BSS. Additionally, the malicious color collision event detection logic 104 may also notify the system administrator of a location of the potentially malicious content. At operation 312, the malicious color collision event detection logic 104 may generate a radio frequency fingerprint of the source, such as rogue device 112, of the color collision events. The radio frequency fingerprint may include wireless transmission characteristics (RSSI, bandwidth, center frequency, duration, etc.) that are unique to the source of the color collision event.

Turning to FIG. 4, shown is a flowchart depicting a method 400 for detecting and containing malicious color collision events, according to an example embodiment. The method 400 may be performed by, for example, the malicious color collision event detection logic 104 operating at a management entity. At operation 402, a management entity may obtain from a first wireless access point, a BSS color collision event detected by the first wireless access point. For example, the first wireless access point may be in a BSS and using a first BSS color. As described above, BSS colors may be included within transmissions (frames or PPDUs) to identify or distinguish different BSSs operating on a common or overlapped frequency channel. A color collision event may occur when the first wireless access point receives a transmission (frame or PPDU), that includes the first BSS color from a device (access point or client) operating in a BSS of a different physical wireless access point. It is to be noted that a given radio (AP) may have one or more BSSs, all of which share the same color. Therefore, for a collision event to occur, the first BSS color needs to be in a PPDU or frame received from a device in a BSS of a different physical wireless access point, that is a different physical device than the first wireless access point.

At operation 404, the management entity may obtain from the first wireless access point an indication of whether the color collision event has been detected for a time period greater than a predetermined duration threshold. In other words, the malicious color collision event detection logic may determine whether the color collision event is persistent.

At operation 406, after the malicious color collision event logic has determined that the color collision event has been detected for a time period greater than the predetermined duration threshold, the malicious color collision event detection logic may determine a probability of the color collision event. To determine the probability of the color collision event, the malicious color collision event detection logic may determine a number of neighboring BSSs within a predefined geographic area and the BSS color associated with each of the neighboring BSSs. The malicious color collision event detection logic may then determine the probability of the color collision event based on the number of BSS colors being used by the neighboring BSSs and the total number of colors available.

At operation 408, based on the probability of the color collision event, the malicious color collision event detection logic may determine whether the color collision event is benign or malicious. For example, when the probability of the color collision event is less than a predetermined probability threshold and a number of BSS color changes that have occurred at the wireless access point is greater than a predetermined color change threshold, the malicious color collision event logic may determine that the color collision event is malicious. Otherwise, the malicious color collision event logic may determine that the color collision event is benign.

At operation 410, the malicious color collision event logic may maintain the first BSS color of the first wireless access point when the color collision event is malicious. If the color collision event is malicious and the first wireless access point were to change BSS colors, client devices of the wireless access point may experience a denial of service.

Figure 5:
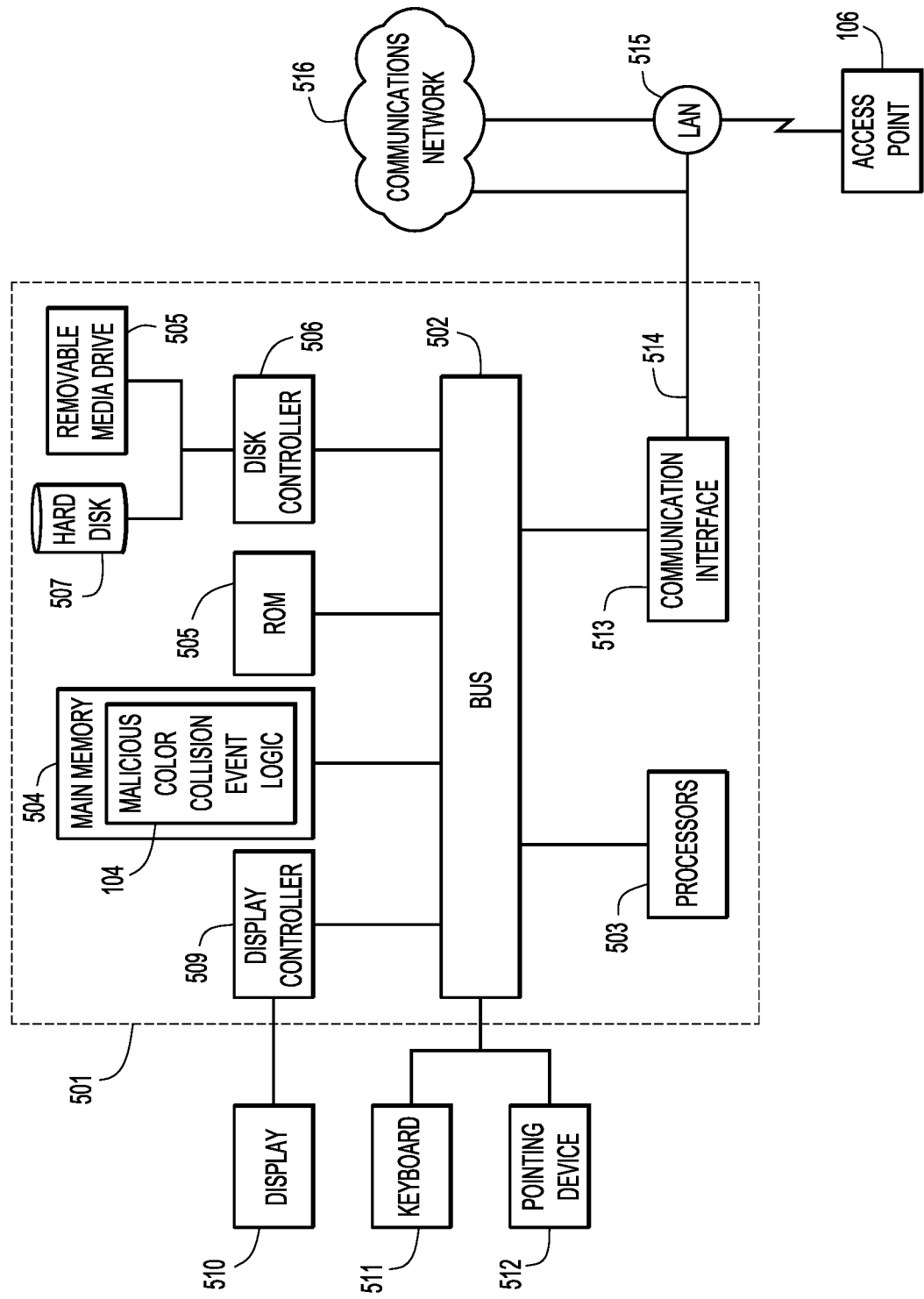
FIG. 5 is a block diagram of a server configured to perform malicious color collision event techniques, according to an example embodiment.

FIG. 5 is a block diagram showing a server, e.g., management entity 102 shown in FIG. 1, configured to perform the malicious color collision event techniques, according to an example embodiment. FIG. 5 illustrates a computer system 501 upon which the embodiments presented may be implemented. The computer system 501 includes a bus 502 or other communication mechanism for communicating information, and a processor 503 coupled with the bus 502 for processing the information. While the figure shows a single block for a processor 503, it should be understood that the processors 503 represent a plurality of processing cores, each of which can perform separate processing. The computer system 501 also includes a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions to be executed by processor 503. In addition, the main memory 504 may be used for storing temporary variables or other intermediate information during the execution of instructions by the processor 503. For example, the main memory 504 may store instructions for the malicious color collision event detection logic 104.

The computer system 501 further includes a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 also includes a disk controller 506 coupled to the bus 502 to control one or more storage devices for storing information and instructions, such as a hard disk 507, and a removable media drive 508 (e.g., read-only compact disc drive, read/write compact disc drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 501 may also include a display controller 509 coupled to the bus 502 to control a display 510, such as a flat screen display, for displaying information to a computer user. The computer system 501 includes input devices, such as a keyboard 511 and a pointing device 512, for interacting with a computer user and providing information to the processor 503. The pointing device 512, for example, may be a mouse, a trackball, or a pointing stick for communicating direction information and command selections to the processor 503 and for controlling cursor movement on the display 510.

The computer system 501 performs a portion or all of the processing steps of the process in response to the processor 503 executing one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to the embodiments presented, for containing data structures, tables, records, or other data described herein. Examples of computer readable media are compact discs, hard disks, PROMs (EPROM, EEPROM, flash EPROM), DRAM, SRAM, SD RAM, or any other magnetic medium, compact discs (e.g., CD-ROM), or any other optical medium, or any other medium from which a computer can read.

Stored on any one or on a combination of non-transitory computer readable storage media, embodiments presented herein include software for controlling the computer system 501, for driving a device or devices for implementing the process, and for enabling the computer system 501 to interact with a human user. Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 516 such as the Internet. For example, the communication interface 513 may be a wired or wireless network interface card to attach to any packet switched (wired or wireless) LAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through network 515 (e.g., a LAN) or through equipment operated by a service provider, which provides communication services through a communications network 516. The network link 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the computer system 501 may be implemented in baseband signals, or carrier wave based signals. The computer system 501 can transmit and receive data, including program code, through the network(s) 515 and 516, the network link 514 and the communication interface 513. Moreover, the network link 514 may provide a connection through network 515 to a wireless access point 106.

In summary, a method for detecting and containing malicious color collision events is disclosed. The method includes obtaining, at a management entity for a WLAN from a first wireless access point, a color collision event detected by the first wireless access point. The wireless first access point uses a first BSS color. The BSS color is an identifier included in transmissions by the access point to distinguish different BSSs using a common or overlapped frequency channel. A color collision event occurs when the first access point receives from a device in a BSS of a different physical wireless access point a frame or PPDU that includes the first BSS color. The management entity then obtains, from the first wireless access point, an indication of whether the color collision event has been detected for a time period greater than a predetermined duration threshold. When the color collision event has been detected for the time period greater than the predetermined duration threshold, the management entity computes a probability of the color collision event. Based on the probability of the color collision event, the management entity determines whether the color collision event is benign or malicious. When the color collision event is malicious, the first BSS color of the first wireless access point is maintained.

In another embodiment, when the color collision event is malicious, the method also includes at least one of: increasing the predetermined time threshold, and notifying an administrator that there was a malicious color collision event.

In another aspect, the color collision event is determined to be malicious based on whether at least one of: the probability of the color collision event is less than a predetermined probability threshold and a number of color changes is greater than a predetermined threshold color change, the color collision event has been occurring for less than a predetermined percentage of time, or no clients of a source of the color collision event have been detected in a preceding tracking window.

In another embodiment, when obtaining the indication that the color collision event has been detected for a time period greater than the predetermined duration threshold, the method also tracks a number of times when a color change occurred in a previous time period and compares the number of times to a predetermined threshold.

In another aspect, the color collision event is determined to be benign when a source of the color collision event is a second wireless access point controlled by the management entity.

In another embodiment, when the color collision event is benign, the method also includes at least one of: changing the first BSS color used by the first wireless access point to a second BSS color, and directing n-hop neighbors of the first wireless access point not to use the first BSS color on the common or overlapped frequency channel, where n is a predetermined integer.

In another aspect, the method also includes generating a radio frequency fingerprint associated with a source of the color collision event, the radio frequency fingerprint include wireless transmission characteristics unique to the source of the color collision event.

In another embodiment, an apparatus is provided that includes a communication interface configured to enable network communications and a processor coupled with the communication interface. The processor is configured to obtain, from a first wireless access point, a color collision event detected by the first wireless access point. The wireless first access point uses a first BSS color. The BSS color is an identifier included in transmissions by the first wireless access point to distinguish different BSSs using a common or overlapped frequency channel. A color collision event occurs when the first wireless access point receives from a device in a BSS of a different physical wireless access point a frame or PPDU that includes the first BSS color. The processing device then obtains, from the first wireless access point, an indication of whether the color collision event has been detected for a time period greater than a predetermined duration threshold. When the color collision event has been detected for the time period greater than the predetermined duration threshold, the processing device computes a probability of the color collision event. Based on the probability of the color collision event, the processing device determines whether the color collision event is benign or malicious. When the color collision event is malicious, the first BSS color of the first wireless access point is maintained.

In yet another embodiment, one or more non-transitory computer readable storage media encoded with instructions are provided. The instructions, when executed by a processor, cause the processor to obtain, from a first wireless access point, a color collision event detected by the first wireless access point. The wireless first access point uses a first BSS color. The BSS color is an identifier included in transmissions by the first wireless access point to distinguish different BSSs using a common or overlapped frequency channel. A color collision event occurs when the first access point receives from a device in a BSS of a different physical wireless access point a frame or PPDU that includes the first BSS color. The processor then obtains, from the first wireless access point, an indication of whether the color collision event has been detected for a time period greater than a predetermined duration threshold. When the color collision event has been detected for the time period greater than the predetermined duration threshold, the processor computes a probability of the color collision event. Based on the probability of the color collision event, the processor determines whether the color collision event is benign or malicious. When the color collision event is malicious, the first BSS color of the first wireless access point is maintained.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   obtaining at a management entity for a wireless local area network (WLAN), from a first wireless access point using a first Basic Service Set (BSS) color, a color collision event detected by the first wireless access point, wherein a BSS color is an identifier included in transmissions by the first wireless access point to distinguish BSSs using a common or overlapped frequency channel and a color collision event occurs when the first wireless access point receives from a device in a BSS of a different physical wireless access point a frame or Physical Protocol Data Unit (PPDU) that includes the first BSS color;
   obtaining, from the first wireless access point, an indication of whether the color collision event has been detected for a time period greater than a predetermined duration threshold;
   when the color collision event has been detected for the time period greater than the predetermined duration threshold, computing a probability of the color collision event;
   based on the probability of the color collision event, determining whether the color collision event is benign or malicious; and
   maintaining the first BSS color of the first wireless access point when the color collision event is malicious.

2. The method of claim 1, wherein when the color collision event is malicious, the method further comprises at least one of:
   increasing the predetermined duration threshold; and
   notifying an administrator that there was a malicious color collision event.

3. The method of claim 1, wherein the color collision event is determined to be malicious based on whether at least one of:
   the probability of the color collision event is less than a predetermined probability threshold and/or a number of color changes is greater than a predetermined number of color changes threshold;
   the color collision event has been occurring for less than a predetermined percentage of time; or
   no clients of a source of the color collision event have been detected in a preceding tracking window.

4. The method of claim 1, wherein obtaining the indication comprises:
   tracking a number of times when a color change occurred in a previous time period; and
   comparing the number of times to a predetermined threshold.

5. The method of claim 1, wherein computing the probability of the color collision event is based on a number of BSSs in a predetermined geographical area and colors each respective BSS is using.

6. The method of claim 1, wherein the color collision event is determined to be benign when a source of the color collision event is a second wireless access point controlled by the management entity.

7. The method of claim 1, wherein when the color collision event is benign, the method further comprises at least one of:
   changing the first BSS color used by the first wireless access point to a second BSS color; and
   directing n-hop neighbors of the first wireless access point not to use the first BSS color on the common or overlapped frequency channel, where n is a predetermined integer.

8. The method of claim 1, further comprising:
   generating a radio frequency fingerprint of a source of the color collision event, the radio frequency fingerprint includes wireless transmission characteristics unique to the source of the color collision event.

9. An apparatus comprising:
   a communication interface configured to enable network communications;

a hardware processor coupled with the communication interface, and configured to:

obtain from a first wireless access point using a first Basic Service Set (BSS) color, a color collision event detected by the first wireless access point, wherein a BSS color is an identifier included in transmissions by the first wireless access point to distinguish different BSSs using a common or overlapped frequency channel and a color collision event occurs when the first wireless access point receives from a device in a BSS of a different physical wireless access point a frame or Physical Protocol Data Unit (PPDU) that includes the first BSS color;

obtain, from the first wireless access point, an indication of whether the color collision event has been detected for a time period greater than a predetermined duration threshold;

when the color collision event has been detected for the time period greater than the predetermined duration threshold, compute a probability of the color collision event;

based on the probability of the color collision event, determine whether the color collision event is benign or malicious; and maintain the first BSS color of the first wireless access point when the color collision event is malicious.

10. The apparatus of claim 9, wherein when the color collision event is malicious, the processor is further configured to at least one of:

increase the predetermined duration threshold; and notify an administrator that there was a malicious color collision event.

11. The apparatus of claim 9, wherein the processor is configured to determine the color collision event to be malicious based on whether at least one of:

the probability of the color collision event is less than a predetermined probability threshold and/or a number of color changes is greater than a predetermined number of color changes threshold;

the color collision event has been occurring for more than a predetermined percentage of time; or no clients of a source of the color collision event have been detected in a preceding tracking window.

12. The apparatus of claim 9, wherein the processor is further configured to:

track a number of times when a color change occurred in a previous time period; and compare the number of times to a predetermined threshold.

13. The apparatus of claim 9, wherein the processor is configured to compute the probability of the color collision event based on a number of BSSs in a predetermined geographical area and colors each respective BSS is using.

14. The apparatus of claim 9, wherein the processor is configured to determine that the color collision event is benign when a source of the color collision event is a second wireless access point in a same administrative domain as the first wireless access point.

15. The apparatus of claim 9, wherein when the color collision event is benign, the processor is further configured to at least one of:

change the first BSS color used by the first wireless access point to a second BSS color; and direct n-hop neighbors of the first wireless access point not to use the first BSS color on the common or overlapped frequency channel, where n is a predetermined integer.

16. The apparatus of claim 9, wherein the processor is further configured to:

generate a radio frequency fingerprint of a source of the color collision event, the radio frequency fingerprint include wireless transmission characteristics unique to the source of the color collision event.

17. One or more non-transitory computer readable storage media encoded with instructions that, when executed by a processor, cause the processor to:

obtain, at a management entity for a wireless local area network (WLAN) from a first wireless access point using a first Basic Service Set (BSS) color, a color collision event detected by the first wireless access point, wherein a BSS color is an identifier included in transmissions by the first wireless access point to distinguish different BSSs using a common or overlapped frequency channel and a color collision event occurs when the first wireless access point receives from a device in a BSS of a different physical wireless access point a frame or Physical Protocol Data Unit (PPDU) that includes the first BSS color;

obtain, from the first wireless access point, an indication of whether the color collision event has been detected for a time period greater than a predetermined duration threshold;

when the color collision event has been detected for the time period greater than the predetermined duration threshold, compute a probability of the color collision event;

based on the probability of the color collision event, determine whether the color collision event is benign or malicious; and maintain the first BSS color of the first wireless access point when the color collision event is malicious.

18. The one or more non-transitory computer readable storage media of claim 17, wherein when the color collision event is malicious, the instructions further cause the processor to at least one of:

increase the predetermined duration threshold; and notify an administrator that there was a malicious color collision event.

19. The one or more non-transitory computer readable storage media of claim 17, wherein the color collision event is determined to be malicious based on whether at least one of:

the probability of the color collision event is less than a predetermined probability threshold and/or a number of color changes is greater than a predetermined number of color changes threshold;

the color collision event has been occurring for more than a predetermined percentage of time; or no clients of a source of the color collision event have been detected in a preceding tracking window.

20. The one or more non-transitory computer readable storage media of claim 17, wherein the instructions further cause the processor to:

track a number of times when a color change occurred in a previous time period; and compare the number of times to a predetermined threshold.

* * * * *